(12) United States Patent
Voelz et al.

(10) Patent No.: US 11,480,978 B2
(45) Date of Patent: Oct. 25, 2022

(54) METHOD AND DEVICE FOR OPERATING AN AUTOMATED VEHICLE

(71) Applicant: Robert Bosch GmbH, Stuttgart (DE)

(72) Inventors: Benjamin Voelz, Leonberg (DE); Matthias Haug, Renningen (DE); Matthias Maier, Weissach (DE); Michael Gabb, Gaeufelden (DE); Ruediger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 16/864,630

(22) Filed: May 1, 2020

(65) Prior Publication Data
US 2020/0356095 A1 Nov. 12, 2020

(30) Foreign Application Priority Data

May 10, 2019 (DE) .......................... 102019206847.2

(51) Int. Cl.
*G05D 1/02* (2020.01)
*H04W 4/44* (2018.01)
*G08G 1/01* (2006.01)

(52) U.S. Cl.
CPC ............ *G05D 1/028* (2013.01); *G05D 1/0285* (2013.01); *G08G 1/0116* (2013.01); *H04W 4/44* (2018.02)

(58) Field of Classification Search
CPC ....... G05D 1/028; G05D 1/0285; H04W 4/44; G08G 1/0116
See application file for complete search history.

(56) References Cited

U.S. PATENT DOCUMENTS

| | | | | |
|---|---|---|---|---|
| 9,091,558 | B2* | 7/2015 | Su | ........................ G01C 21/34 |
| 10,152,058 | B2* | 12/2018 | Bennie | ................... G05D 1/028 |
| 10,595,175 | B2* | 3/2020 | Ramalho de Oliveira ................ G08G 1/0112 |
| 10,976,745 | B2* | 4/2021 | Chu | ...................... G05D 1/0088 |
| 10,992,752 | B2* | 4/2021 | Graefe | ................. H04W 84/18 |
| 11,092,444 | B2* | 8/2021 | Stess | ..................... G01S 17/931 |
| 2015/0177007 | A1* | 6/2015 | Su | ...................... G01C 21/3647 701/25 |
| 2017/0227971 | A1* | 8/2017 | Shimotani | .......... G01C 21/3461 |

(Continued)

FOREIGN PATENT DOCUMENTS

| | | |
|---|---|---|
| DE | 102014224104 A1 | 6/2016 |
| DE | 102017207097 A1 | 10/2018 |

(Continued)

OTHER PUBLICATIONS

Norm SAE J3016, Jun. 15, 2018. Taxonomy and definitions for terms related to driving automation systems for on-road motor vehicles, pp. 1-35.

*Primary Examiner* — Luis A Martinez Borrero
(74) *Attorney, Agent, or Firm* — Norton Rose Fulbright US LLP; Gerard Messina

(57) ABSTRACT

A method and device for operating an automated vehicle. The method includes a step of receiving a position of the automated vehicle, a step of providing a map, as a function of the position, a step of receiving environment data values, which represent an environment of the automated vehicle, as a function of the position, a step of producing an environment model, as a function of the environment, on the basis of the map, and a step of operating the automated vehicle, as a function of the environment model.

10 Claims, 3 Drawing Sheets

(56) References Cited

U.S. PATENT DOCUMENTS

| | | | |
|---|---|---|---|
| 2017/0287335 A1* | 10/2017 | Ansari | B60W 40/04 |
| 2018/0113459 A1* | 4/2018 | Bennie | G05D 1/0223 |
| 2018/0164827 A1* | 6/2018 | Chu | G05D 1/0274 |
| 2018/0284774 A1* | 10/2018 | Kawamoto | B60W 50/14 |
| 2018/0376305 A1* | 12/2018 | Ramalho de Oliveira | H04W 4/44 |
| 2019/0220011 A1* | 7/2019 | Della Penna | G06V 20/58 |
| 2019/0222652 A1* | 7/2019 | Graefe | H04L 67/12 |
| 2020/0018606 A1* | 1/2020 | Wolcott | G01C 21/3602 |
| 2020/0133272 A1* | 4/2020 | Chong | G05D 1/0088 |

FOREIGN PATENT DOCUMENTS

| | | |
|---|---|---|
| DE | 102017210961 A1 | 1/2019 |
| DE | 102017212227 A1 | 1/2019 |

* cited by examiner

METHOD AND DEVICE FOR OPERATING AN AUTOMATED VEHICLE

CROSS REFERENCE

The present application claims the benefit under 35 U.S.C. § 119 of German Patent Application DE 102019206847.2 filed on May 10, 2019, which is expressly incorporated herein by reference in its entirety.

FIELD

The present invention relates, inter alia, to a method for operating an automated vehicle, comprising a step of receiving a position of the automated vehicle, a step of providing a map, a step of receiving environment data values, a step of producing an environment model and a step of operating the automated vehicle, as a function of the environment model.

SUMMARY

An example method of the present invention for operating an automated vehicle comprises a step of receiving a position of the automated vehicle, a step of providing a map, as a function of the position, and a step of receiving environment data values, which represent an environment of the automated vehicle, as a function of the position. The example method furthermore comprises a step of producing an environment model, as a function of the environment, on the basis of the map, and a step of operating the automated vehicle, as a function of the environment model.

An automated vehicle is to be understood as a vehicle that is developed in accordance with one of the SAE levels 1 through 5 (see SAE J3016 standard).

An operation of the automated vehicle is to be understood for example as the determination of a trajectory for the automated vehicle and/or the driving of the trajectory by way of an automated lateral and/or longitudinal control and/or the execution of safety-related driving functions such as, for example, an output of a warning signal (for example, to an occupant of the automated vehicle).

A map is to be understood for example as a digital map, which exists in the form of (map) data values on a storage medium. This map is designed for example in such a way that one or multiple map layers are comprised, one map layer showing for example a map from a bird's-eye view (course and position of roads, buildings, landscape features, etc.). This corresponds for example to a map of a navigation system. Another map layer comprises for example a radar map, the environmental features depicted by the radar map being stored together with a radar signature. Another map layer comprises for example a LiDAR map, environmental features depicted by the LiDAR map being stored with a LiDAR point cloud and/or LiDAR point objects. Another map layer comprises for example a video map, environmental features depicted by the video map being stored with objects detectable by a video sensor.

An environment of the vehicle is to be understood for example as at least one area which may be sensed by an environment sensor system. An environment may also be understood as a road section and/or larger areas (municipal districts, regions, etc.).

An environment model is to be understood for example as an extended map, which in addition to a course of a road, etc. also comprises objects currently present in the environment, which are present in the environment for example only for a limited duration. These are to be understood, for example, as objects, which generally influence the operation of the automated vehicle, that is, which have the effect of necessitating an adaptation of a speed and/or an adaptation of a trajectory (here by way of example: an evasive maneuver) and/or other adaptations.

The example method according to the present invention advantageously achieves the objective of providing a safe operation of an automated vehicle as well as increasing the safety in road traffic generally. Especially a constantly changing environment represents a great safety challenge when operating an automated vehicle both for the vehicle itself as well as for the environment of this vehicle. This objective is achieved by the method in accordances with the present invention, in that an environment model is used for operating the vehicle, which in accordance with the present invention uses both a map as well as current environment data values that represent a current environment of the automated vehicle. This makes it possible to take into account even sudden possible changes such as for example a construction site and/or a disabled vehicle and/or rapidly changing weather conditions, etc.

The reception of the environment data values preferably occurs in that these are requested in advance from an infrastructure sensor system.

An infrastructure sensor system is to be understood for example as the above-mentioned environment sensor system, this environment sensor system being comprised by an infrastructure facility such as for example a street light and/or a traffic sign and/or a guardrail and/or further infrastructure facilities. In one possible specific embodiment, it is possible to use more than one infrastructure sensor system and/or an infrastructure sensor system may comprise more than one environment sensor system, which detect at least partially the same environment.

An environment sensor system is to be understood for example as at least one video sensor and/or at least one radar sensor and/or at least one LiDAR sensor and/or at least one ultrasonic sensor and/or at least one additional sensor that is designed to detect an environment of the automated vehicle, in particular in the form of environment data values. In one specific embodiment, the environment sensor system additionally comprises for example evaluation means (processor, working memory, hard disk, software), which are designed to evaluate the environment data values and thus to detect and/or to determine for example individual objects in the environment of the automated vehicle.

This yields the advantage of making it possible quickly and reliably to produce a current environment model for any environment comprising a corresponding environment sensor system and to use it to operate the automated vehicle.

The operation preferably comprises, as a function of the environment model, a determination and/or driving of a trajectory in the environment.

Driving the trajectory is to be understood for example as a drive of the automated vehicle along the trajectory using an automated lateral and/or longitudinal control. Furthermore, an operation is to be understood additionally or alternatively as for example the execution of safety-related driving functions such as for example an output of a warning signal (for example to an occupant of the automated vehicle).

This yields the advantage of making it possible to employ an active traffic control, possibly also of multiple or ideally even of all (automated) vehicles in a respective environment or in a respective area, and thus to provide increased traffic safety.

The environment model preferably comprises at least one obstacle and/or one road condition and/or at least one additional vehicle.

An obstacle is to be understood for example as an object (construction site, lost objects from other vehicles, etc.) or road users (bicycle riders, pedestrians, etc.), which at least partially constricts and/or blocks a traffic route used by the automated vehicle in such a way that it is necessary to adapt a trajectory. A road condition is to be understood for example as a structural state of a road (pot holes, cracks, general character (asphalt, mud, grass, gravel, etc.)) and/or as a weather-related condition of the road (dry, wet, slippery, icy, etc.) and/or additional states. At least one additional vehicle is to be understood for example as a vehicle, which approaches the automated vehicle in oncoming traffic and/or which moves in the same driving direction in such a slow manner that a passing maneuver becomes necessary and/or other vehicles, which may represent for example a safety risk for the automated vehicle.

This yields the advantage of increasing traffic safety further since special attention is paid in particular to those objects that may result in a substantial safety risk in the operation of the automated vehicle.

An example device according to the present invention, in particular a processing unit, is designed to perform all steps of the method according to one of the method claims.

In one specific embodiment, the example device comprises a processing unit (processor, working memory, hard disk) as well as suitable software (computer program) for implementing the method according to one of the method claims. In one specific embodiment, the device comprises a transmitter and/or receiver unit, which is designed for example to exchange (map) data values and/or instructions for operating an automated vehicle with a vehicle and/or an external server or a cloud. In another specific embodiment, the device is developed as a server or cloud (that is, a network of servers or processing units).

Furthermore, a computer program is provided, comprising commands that prompt a computer, when executing the computer program, to implement a method in accordance with one of the method claims for operating the automated vehicle.

Furthermore, a machine-readable storage medium is provided, on which the computer program is stored.

Advantageous further developments of the present invention are described herein.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

Figure 1:
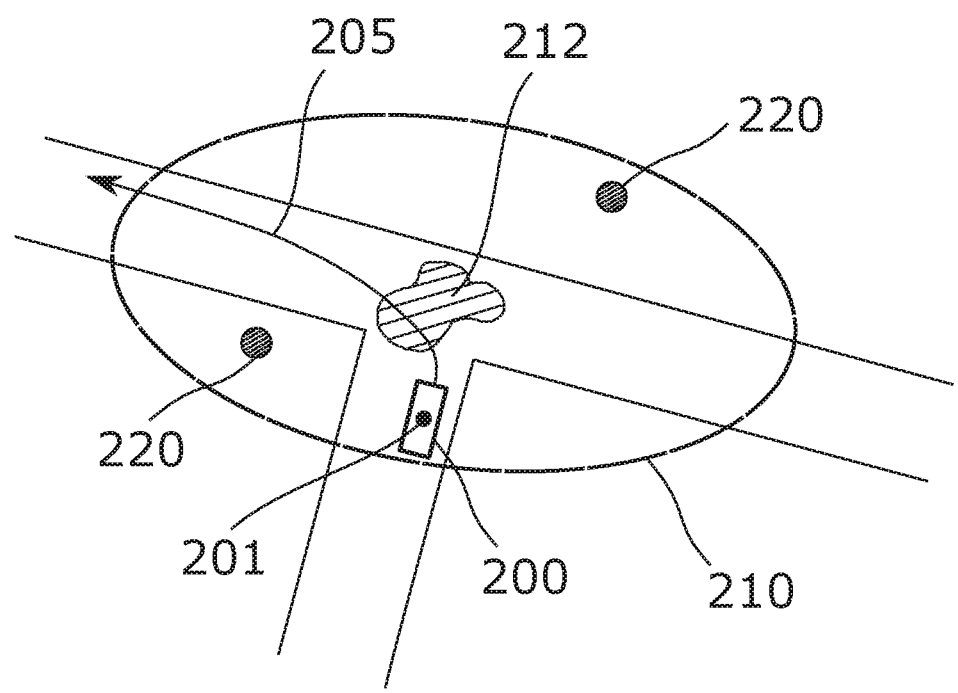
FIG. 1 shows an exemplary embodiment of the method according to the present invention.
Figure 1:
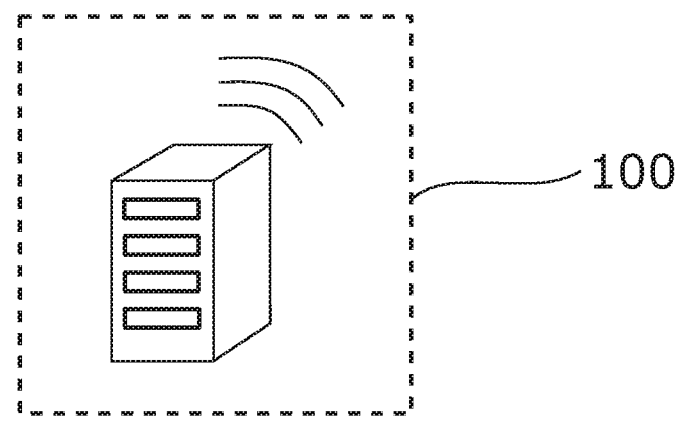

FIG. 1 shows an exemplary embodiment in accordance with the present invention of method 300 for operating 350 an automated vehicle 200, which here purely by way of example approaches an intersection and is to make a left turn, for example in response to an input by an occupant.

Method 300 now begins, for example, in that the automated vehicle requests support from device 100 and for this purpose transmits at least its position 201 to device 100. Position 201 is determined on the part of automated vehicle 200 for example by way of a localization device (navigation system, etc.) in the form of a GPS position in GNSS coordinates and refers for example to a specific location of automated vehicle 200.

Device 100 receives this position 201 and subsequently provides a map, as a function of position 201. This is to be understood in the sense that device 100 comprises for example one or multiple maps (on a storage medium) and loads at least one relevant map section, with respect to position 201, for implementing method 300. In one specific embodiment, providing 320 the map is to be understood for example in the sense that the map is requested and downloaded from an external server, rather than from device 100.

Furthermore, device 100 requests environment data values, which represent an environment 210 of automated vehicle 200, as a function of position 201, for example from at least one, here, purely by way of example, two infrastructure sensor system and subsequently receives these environment data values. For this purpose, the infrastructure sensor system comprises for example a transmitting and/or receiving unit or is connected to a transmitting and/or receiving unit for transmitting environment data values.

Subsequently, device 100 produces an environment model as a function of the environment 210 and on the basis of the map and subsequently makes this environment model available for operating 350 the automated vehicle 200 as a function of the environment model. This is to be understood for example in the sense that method 300 ends in that at least one driving instruction for the operation 350 is transmitted to automated vehicle 200 in the form of data values or in the form of a data signal. This driving instruction comprises for example a trajectory 205 and/or one or multiple different speed specifications along this trajectory 205.

During the period of time in which automated vehicle 200 approaches the environment and/or drives through this environment, environment 210 comprises for example a road condition 212 (spilled oil, ice, standing water due to rain, gravel, etc.), which for safety-related aspects necessitates a reduction of the normally used speed so that automated vehicle 200 is able to negotiate the left curve, indicated here purely by way of example, safely, that is, without endangering automated vehicle 200 and/or for example an occupant of automated vehicle 200. For this purpose, device 100 comprises for example speed specifications in the form of tables that are to be used maximally depending on specified road conditions 212.

In the specific embodiment shown here purely by way of example, more than one infrastructure sensor system 220 is used in order to detect environment 210 in the form of environment data values. Due to the varying specific embodiment of the respective sensor system (radar and video, radar and LiDAR, etc.) and/or due to a varying range and/or due to a varying resolution and/or due to a varying mounting height or a varying viewing angle onto environment 210, this may be used to obtain a better or more detailed or more precise description, for example concerning the extent and/or character of the respective road condition. With respect to device 100, this subsequently results in the ability to produce a more exact or more complete environment model, which in turn allows for a more exact or complete specification for operating 350 automated vehicle 200.

Figure 2:
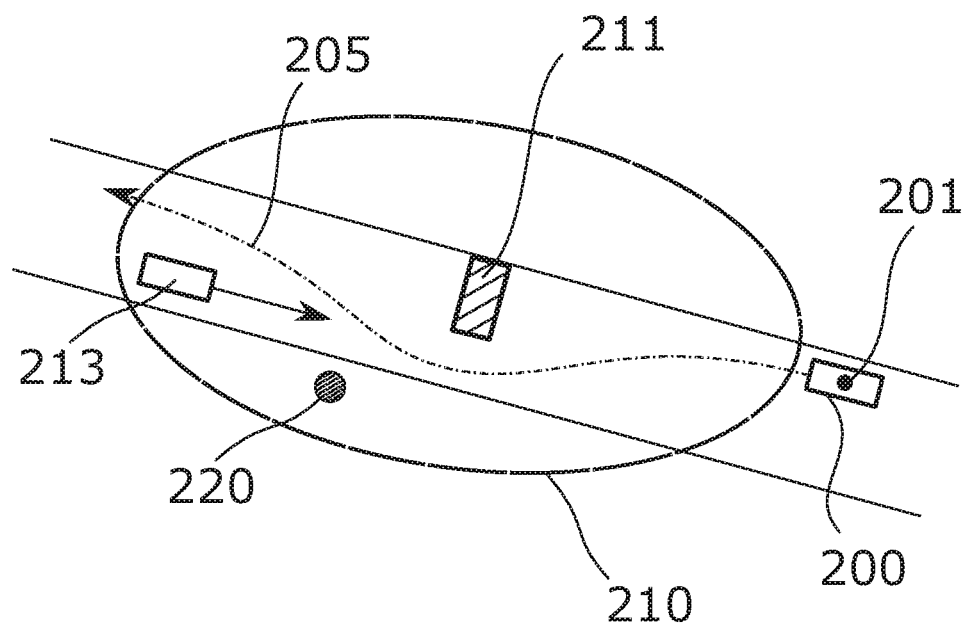
FIG. 2 shows another exemplary embodiment of the method according to the present invention.
Figure 2:
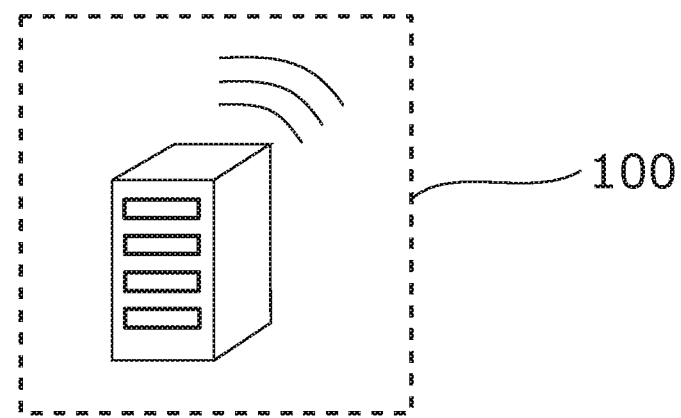

FIG. 2 shows another exemplary embodiment of method 300 for operating 350 an automated vehicle 200, which here moves purely by way of example along a traffic route, automated vehicle 200 approaching an obstacle 211 and at the same time at least one further vehicle 213 approaching in oncoming traffic along this traffic route, obstacle 211 and the at least one further vehicle 213 being detected by an infrastructure sensor system 220 and thus being received by device 100.

After additionally a position 201 of automated vehicle 200 was received and a map was provided as a function of position 201 (see also the description regarding FIG. 1), an environment model is subsequently produced as a function of environment 210 and on the basis of the map.

This is followed for example by the operation 350 of automated vehicle 200 in that inter alia—as a function of the environment model—a trajectory 205 and a corresponding speed for automated vehicle 200 driving the trajectory are determined. Trajectory 205 and/or the speed are/is determined for example in such a way that automated vehicle 200 passes obstacle 211, no collision occurs with the at least one further vehicle 213 and nevertheless automated vehicle 200 is not brought to a standstill. This may be achieved on the one hand in that the speed is reduced in such a way that the at least one further vehicle 213 first passes obstacle 211 or, on the other hand, in that the speed is increased in such a way that automated vehicle 200 first passes obstacle 211.

The determination 351 of the trajectory 205, as a function of the environment model, is here based for example on the speed of the at least one further vehicle 213 as well as a first distance between obstacle 211 and automated vehicle 200 and/or a second distance between obstacle 211 and the at least one further vehicle 213.

Figure 3:
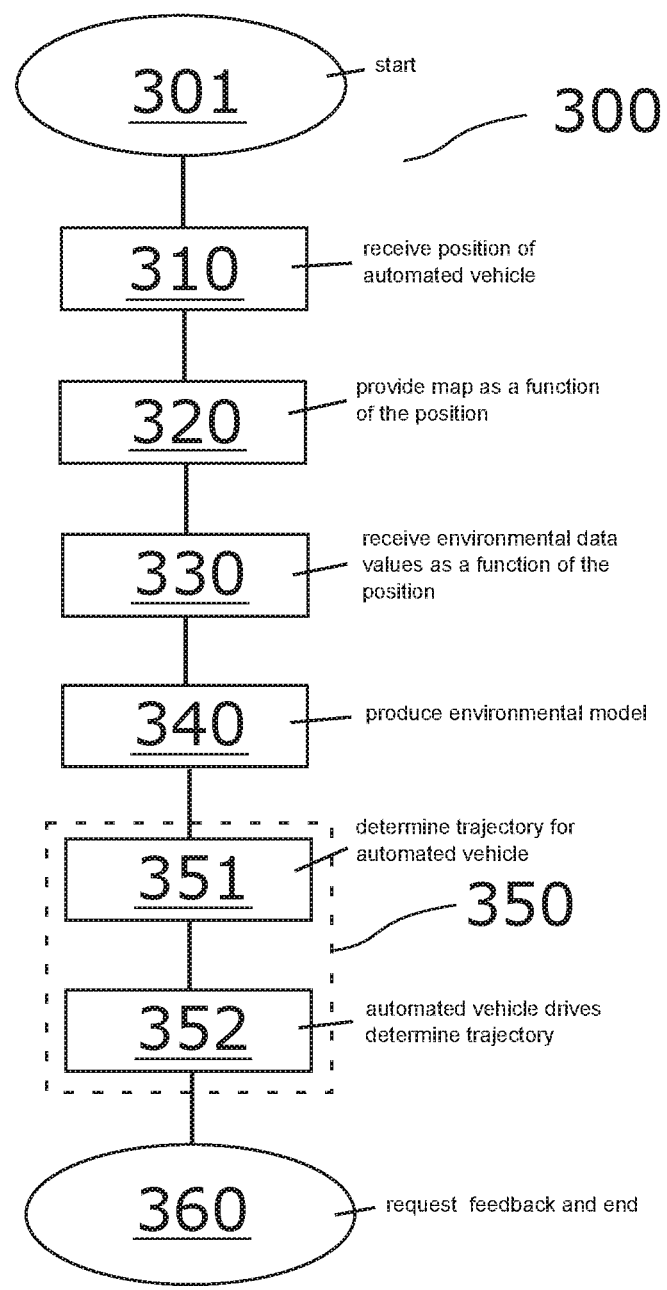
FIG. 3 shows an exemplary embodiment of the method according to the present invention in the form of a flow chart.

FIG. 3 shows an exemplary embodiment of a method 300 for operating 350 an automated vehicle 200.

Method 300 begins with step 301.

In step 310, a position 201 of automated vehicle 200 is received.

In step 320, a map is provided as a function of position 201.

In step 330, environment data values, which represent an environment 210 of automated vehicle 200, are received as a function of position 201.

In step 340, an environment model is produced as a function of environment 210 and on the basis of the map.

In step 350, automated vehicle 200 is operated as a function of the environment model.

In one possible specific embodiment, step 350 comprises for example step 351 and step 352.

In step 351, a trajectory 205 is determined, which is suitable in particular for automated vehicle 200 for (safely) driving through environment 210.

In step 352, automated vehicle 200 drives this previously determined trajectory 205.

Method 300 ends with step 360. In one possible specific embodiment, method 360 ends for example in that device 100 additionally requests and receives a feedback from automated vehicle 200 in the form of data values, this feedback comprising for example an evaluation of the previously determined trajectory 205. This is to be understood for example as a detection of transversal accelerations—along trajectory 205—by the sensor system of automated vehicle 200, the feedback comprising at least these transversal accelerations. These values may be used for example for optimization purposes for subsequent methods.

What is claimed is:

1. A method for operating an automated vehicle, comprising the following steps:
    receiving, by a device from the automated vehicle, a position of the automated vehicle, the device being external to the automated vehicle, and being an external server or an external cloud;
    providing a map as a function of the received position;
    requesting by the device from at least one infrastructure sensor system, as a function of the received position, environment data values which represent an environment of the automated vehicle;
    receiving, by the device from the at least one infrastructure sensor system, the requested environment data values;
    producing, by the device, an environment model, as a function of the received environment data values, based on the map; and
    operating the automated vehicle as a function of the environment model, the operating including transmitting by the device to the automated vehicle at least one driving instruction for operation of the automated vehicle, the at least one driving instruction being determined based on the environment model;
    wherein the at least one driving instruction includes a trajectory for the automated vehicle to drive and/or at least one speed specification for driving along the trajectory by the automated vehicle.

2. The method as recited in claim 1, wherein the operating of the automated vehicle as a function of the environment model includes determining and/or driving a trajectory in the environment.

3. The method as recited in claim 1, wherein the environment model includes at least one obstacle and/or one road condition and/or at least one additional vehicle.

4. The method as recited in claim 1, wherein the infrastructure sensor system is encompassed by a street light and/or a traffic sign and/or a guardrail.

5. The method as recited in claim 1, wherein the at least one driving instruction includes the trajectory for the automated vehicle to drive.

6. The method as recited in claim 5, further comprising:
    receiving, by the device from the automated vehicle, feedback including an evaluation of the trajectory.

7. The method as recited in claim 6, wherein the feedback includes data values of transverse accelerations of the automated vehicle along the trajectory.

8. The method as recited in claim 1, wherein the at least one driving instruction includes the trajectory for the automated vehicle to drive, and the at least one speed specification for driving along the trajectory by the automated vehicle.

9. A device, comprising:
    a processing unit, the processing unit configured to:
        receive, from the automated vehicle, a position of the automated vehicle;
        providing a map as a function of the received position;
        request from at least one infrastructure sensor system, as a function of the received position, environment data values which represent an environment of the automated vehicle
        receive from the at least one infrastructure sensor system them requested environment data values;
        produce an environment model, as a function of the received environment data values, based on the map; and operate the automated vehicle as a function of the environment model, wherein the operating includes transmitting to the automated vehicle at least one driving instruction for operation of the automated vehicle, the at least one driving instruction being determined based on the environment model;

wherein the processing unit is external to the automated vehicle, and is an external server or an external cloud;

wherein the at least one driving instruction includes a trajectory for the automated vehicle to drive and/or at least one speed specification for driving along the trajectory by the automated vehicle.

10. A non-transitory machine-readable storage medium on which is stored a computer program for operating an automated vehicle, the computer program, when executed by a computer, causing the computer to perform the following steps:

receiving, by a device from the automated vehicle, a position of the automated vehicle, the device being external to the automated vehicle, and being an external server or an external cloud;

providing a map as a function of the received position;

requesting by the device from at least one infrastructure sensor system, as a function of the received position, environment data values which represent an environment of the automated vehicle;

receiving, by the device from the at least one infrastructure sensor system, the requested environment data values;

producing, by the device, an environment model, as a function of the received environment data values, based on the map; and operating the automated vehicle as a function of the environment model, the operating including transmitting by the device to the automated vehicle at least one driving instruction for operation of the automated vehicle, the at least one driving instruction being determined based on the environment model;

wherein the at least one driving instruction includes a trajectory for the automated vehicle to drive and/or at least one speed specification for driving along the trajectory by the automated vehicle.

* * * * *